United States Patent [19]
Sausman

[11] 3,893,963
[45] July 8, 1975

[54] COMPOSITION
[75] Inventor: David K. Sausman, Terre Haute, Ind.
[73] Assignee: Commercial Solvents Corporation, Terre Haute, Ind.
[22] Filed: Oct. 13, 1970
[21] Appl. No.: 80,480

[52] U.S. Cl. ............................ 260/29.4 R; 260/69 R
[51] Int. Cl.² ........................................ C08L 61/20
[58] Field of Search ... 260/29.4, 32.4, 33.4, 32.8 N, 260/68, 69, 70, 71; 252/426, 438

[56] References Cited
UNITED STATES PATENTS
| | | | |
|---|---|---|---|
| 2,485,485 | 10/1949 | Dudley | 260/70 R |
| 2,795,513 | 6/1957 | Rossin | 117/11 |
| 2,838,416 | 6/1958 | Babiarz et al. | 264/257 |

Primary Examiner—Joan E. Welcome
Attorney, Agent, or Firm—Robert H. Dewey; Howard E. Post

[57] ABSTRACT

A pre-catalyzed urea-formaldehyde composition suitable for use in the manufacture of pressed particle board and laminated wood articles comprising an aqueous solution of about 20–21% by weight of urea and 50–51% of formaldehyde and 0.1 to 1.0% of a latent catalyst consisting essentially of a mixture of the hydrochloride salt of an amino alkanediol corresponding to the formula

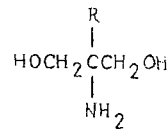

where R is methyl or ethyl, and an alkanolamine corresponding to the formula

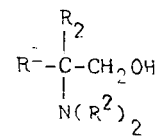

where $R^1$ is hydrogen or alkyl of 1 or 2 carbon atoms, and $R^2$ is hydrogen or methyl in a mole ratio of about 1.5–2.0 of the amino alkanediol per mole of alkanolamine.

8 Claims, No Drawings

COMPOSITION

BACKGROUND OF THE INVENTION

This invention relates to improved ureaformaldehyde adhesives. In a particular aspect, this invention relates to improved urea-formaldehyde adhesives for the manufacture of laminated wood products, including particle or chip board.

Large amounts of urea-formaldehyde resins are used in the manufacture of laminated wood products, such as particle or chip board and plywood. These adhesives are usually prepared at the place of use by reacting formaldehyde and urea in the optimum proportions to produce a partially polymerized resin; for the manufacture of laminates, the resin is applied to the sheets to be laminated which are then assembled to form the article to be laminated and the whole is heated in a press, during which time the partially polymerized resin is completely polymerized, forming a strong bond between the wood surfaces and thereby forming the wood laminate. For the manufacture of particle or chip board, the adhesive is mixed thoroughly with the wood particles or chips and the mixture is then introduced into a press where it is heated under pressure.

Formaldehyde is usually shipped commercially as a 37% aqueous solution, but concentrations as high as 50% are common. Even at the highest concentration, considerable diluent-water- is being shipped at high freight rates. When the formaldehyde is intended for use in urea-formaldehyde adhesives, it is common practice to add urea to these solutions, not only to stabilize the formaldehyde against polymerization at reduced temperatures, but also to make it possible to reduce the water content and provide a higher payload. Mixtures containing 50–51% formaldehyde with 20–21% by weight urea and 29–30% water are common.

When the mixture is received at the place of use, sufficient additional urea is added to provide the optimum mole ratio, and the mixture is then heated (viz. the "resin cook") to form the partially polymerized urea-formaldehyde resin which is then suitable for use as an adhesive.

This practice has been very successful, but the additional heating step—the "resin cook"—and the handling required significantly increase the costs of the process. Accordingly a need exists for an improved adhesive product.

SUMMARY OF THE INVENTION

It is an object of this invention to provide an improved urea-formaldehyde composition.

It is another object of this invention to provide a precatalyzed urea-formaldehyde solution.

It is yet another object of this invention to provide an improved process for the manufacture of particle board and laminated wood articles.

It has been discovered that an improved aqueous urea-formaldehyde solution is obtained by incorporating therein catalytic amounts of a latent catalyst. The latent catalyst useful for the practice of this invention is a mixture of the hydrochloride salt of an amino alkanediol corresponding to the formula

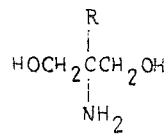

where R is methyl or ethyl, and an alkanolamine corresponding to the formula

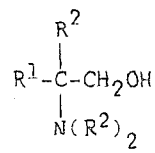

where $R^1$ is hydrogen or alkyl of 1 or 2 carbon atoms and $R^2$ is hydrogen or methyl, in a mole ratio of about 1.5–2.0 of the amino alkanediol per mole of alkanolamine.

The improved composition is particularly suitable for use as the adhesive in the manufacture of particle board and laminated wood articles and eliminates the "resin cook" heating step heretofore required. At the time of use, sufficient urea to provide a desirable mole ratio to formaldehyde, which ratio is known to those skilled in the art, is dissolved in the solution. During the manufacture of laminates, the resulting composition is applied directly without prior heating, to the surfaces of the components to be laminated or is mixed in suitable amounts with particles or chips. The components are then assembled, as is known, and heated in a press at an elevated temperature and pressure and for a length of time sufficient to produce the laminate.

For the manufacture of particle or chip board, the particles or chips are thoroughly mixed with the adhesive in effective amounts in accordance with known methods. The mixture is then heated in a press at a temperature and at a pressure and for a length of time effective to produce the board.

DETAILED DESCRIPTION

The precatalyzed urea-formaldehyde solution of the present invention is prepared by any suitable method, many of which are known. One suitable method is to dissolve gaseous formaldehyde from a formaldehyde generator, e.g. a methanol oxidation unit, in about an equal weight of a solution containing, for example, about 60% water and 40% urea. To this is added catalytic amounts, e.g. from about 0.5 to 1.5% by weight, preferably 0.8–1%, of the latent catalyst herein described. This mixture has good shipping and storage properties. When ready for use, additional urea is dissolved therein to provide the optimum mole ratio of formaldehyde to urea, i.e. about 1.22:1, and the resulting mixture is suitable for use as a thermosetting adhesive without intermediate heating.

It is not intended that the catalyst be limited to any particular concentrations of formaldehyde and urea. The catalyst is effective over wide variations of concentrations.

The proportions of catalyst used in the composition of this invention can be varied within fairly broad limits as hereinbefore set forth. However, in the presence of relatively high proportions of catalyst, package stability becomes progressively poorer. In the presence of relatively low proportions of catalyst, the mixture will not polymerize satisfactorily in the press, thereby resulting in a poor bond. The amount of urea added before use also is important, as is known. Best results are obtained when the ratio is more than about 0.9:1 and less than about 2:1. As the ratio of urea is increased, the hardness of the bonded adhesive increases, but package stability decreases. If either or both the catalyst and urea are decreased, weaker bonding results.

The latent catalyst can be provided by preparing a solution—usually, but not necessarily, aqueous—of the amino alkanediol hydrochloride by known methods, e.g. by mixing the two components in equi-molar amounts, and adding thereto the alkanolamine in a mole ratio of about 1.5–2.0 sufficient to provide a pH of within about 7.5–8.0.

The amino alkanediols suitable for the preparation of the latent catalyst include, but are not limited to, 2-amino-2-methyl-1,3-propanediol and preferably 2-amino-2-ethyl-1,3-propanediol because it generally gives a faster cure. Other amino alkanediols can also be used and they are regarded as obvious equivalents of the preferred compounds. Mixtures of amino alkanediols are also suitable for the practice of this invention. Products of good quality are generally preferred.

The alkanolamines suitable for the compositions of the present invention include, but are not limited to, monoethanolamine, 2-amino-2-methyl-1-propanol, 2-amino-1-butanol and the N,N-dimethyl derivatives of these compounds, as well as mixtures thereof. Other primary and tertiary alkanolamines can also be used and are regarded as obvious equivalents of the preferred alkanolamines. The preferred alkanolamine is 2-amino-2-methyl-1-propanol. Products of good quality are preferred to avoid color development during the baking step. The term alkanolamine as used here is intended to mean mono-amino, monohydroxy substituted alkanes. The amino substituent can also be substituted with alkyl, e.g. methyl, groups.

A suitable and convenient catalyst which is available commercially is Adamac Catalyst 20, marketed by McWhorter Chemical Co., 1645 So. Kilbourn Avenue, Chicago, Illinois, 60623. This product is a nearly-non aqueous solution at about 20% by weight catalyst. When used in the practice of the present invention, it is employed at about 4–5% based on the weight of the urea-formaldehyde solution, thereby providing the preferred concentration of 0.8–1.0% as set forth hereinbefore.

The temperatures and pressures used in forming the laminates and particle board are generally those known and used in the art, e.g. from about 200 to about 300 psig at from about 250° to 350°F. Dwell time in the press is determined by the thickness of the laminate or particle board. For example about 3½ min. for ½ inch board to about 5 min. for ¾ inch board is generally sufficient.

The invention will be better understood with reference to the following examples. It is understood however that the examples are for illustration only, and it is not intended that the invention be limited thereby.

EXAMPLE 1

To 100 parts of an aqueous solution containing 51 parts of formaldehyde and 20 parts of urea there were added increments of Adamac 20 of 1%, 2%, 3%, 4% and 5% by weight respectively. Adamac 20 has the following composition:

| | |
|---|---|
| 2-Amino-2-ethyl-1,3-propanediol hydrochloride | 111 parts |
| 2-Amino-2-methyl-1-propanol | 35 |
| Isobutyl alcohol | 567.5 |
| Water | 44 |

At 20% latent catalyst solids, the Adamac 20 provided catalyst concentrations of 0.2, 0.4, 0.6, 0.8 and 1.0% respectively. The mixtures were divided into 2 portions each. One set was permitted to stand for 7 weeks at ambient temperatures and the other set was permitted to stand for 4 weeks at 50°C. No polymer formation occurred, nor any discoloration. Control samples without latent catalyst developed yellow discoloration. The urea-formaldehyde solutions containing latent catalyst were thus determined to be suitable for handling, shipping and storage without risk of undue polymerization.

EXAMPLE 2

To two portions of 100 parts each of the urea-formaldehyde solution of Example 1 there were added 5 parts and 10 parts respectively of Adamac Catalyst 20, thus providing latent catalyst concentrations of approximately 1% and 2% respectively. Another portion of urea-formaldehyde solution without catalyst was used as a control. These portions were designated 2, 3 and 1 respectively.

Each of the above samples was divided into three portions which were designated 1a, 1b, 1c; 2a, 2b, 2c; and 3a, 3b and 3c respectively. To each of the a samples there was added sufficient urea to provide a mole ratio of formaldehyde:urea of 0.91; to each of the b samples was added sufficient urea to provide a mole ratio of 1.22; and to each of the c samples was added sufficient urea to provide a mole ratio of 2.

To a portion, 20 parts, of each of the above 9 samples was added 6 parts of wood flour and a slurry was formed. The slurry was cast into ¼ inch plaques which were then baked at 275°F for 30 minutes. All of the catalyzed samples cured well. At a mole ratio of formaldehyde:urea of 0.91 the most rigid plaque was produced whereas at a mole ratio of 2, the plaques were crumbly and semi-soft.

EXAMPLE 3

The nine mixtures prepared in Example 2 were further tested for preparing fir laminates. Strips of fir 5 inches×1 inch×⅛ inch were prepared and three strips were laminated by placing 1 ml of each urea-formaldehyde solution between each contacting surface. Each of the assembled articles was sealed in foil and laminated in a press at 250°F and 200 psig for 30 minutes. After 1 hour, the laminate was tested for satisfactory cure and water resistance.

The laminates were prepared in duplicate. One set was placed in boiling water for 1 hour after removing from the press, and the other set was allowed to age 1 hour at room temperature. The strength of the laminate was then tested by wedging a scalpel at the fir strip interfaces and attempting to pry apart. Wood failure was reported as "pass". Adhesive failure was reported as approximate surface area which failed. The results are summed up in the following table.

| Sample No. | Catalyst % Wt. | Mole Ratio HCHO/Urea | Stability Hours | Laminate 1 Hour | Laminate 1 Hour in H₂O at 100°C |
|---|---|---|---|---|---|
| 1a | 0 | 0.91 | 96 | Pass | — |
| 1b | 0 | 1.22 | — | 50% Fail | — |
| 1c | 0 | 2 | — | 60% Fail | — |
| 2a | 1 | 0.91 | 2 | Pass | 30% Fail |
| 2b | 1 | 1.22 | 3 | Pass | Pass |
| 2c | 1 | 2 | 168 | 50% Fail | Pass |
| 3a | 2 | 0.91 | 1¾ | Pass | Pass |
| 3b | 2 | 1.22 | 2¼ | Pass | Pass |
| 3c | 2 | 2 | 168 | Pass | 70% Fail |

EXAMPLE 4

The experiment of Example 1 is repeated except that 2-amino-2-methyl-1,3-propanediol is substituted for 2-amino-2-ethyl-1,3-propanediol and water is substituted for isobutyl alcohol. The resulting catalyst composition is incorporated in urea-formaldehyde solution. The solution has a satisfactory shelf life, and when additional urea is dissolved therein and applied to an article and heated, it cures rapidly.

EXAMPLE 5

The experiment of Example 4 is repeated except that 2-amino-1-butanol is substituted for 2-amino-2-methyl-1-propanol. The resulting composition has good shelf life, and when additional urea is added and the composition is used to laminate articles, it cures rapidly at elevated temperatures.

EXAMPLE 6

The experiment of Example 4 is repeated except that monoethanolamine is substituted for 2-amino-2-methyl-1-propanol. The resulting composition has good shelf life, and when additional urea is added and the composition is used to laminate articles, it cures rapidly at elevated temperatures.

EXAMPLE 7

The experiment of Example 4 is repeated except that N,N-dimethyl-2-amino-2-methyl-1-propanol is substituted for 2-amino-2-methyl-1-propanol. The resulting composition has good shelf life, and when additional urea is added and the composition is used to laminate articles, it cures rapidly at elevated temperatures.

EXAMPLE 8

The experiment of Example 4 is repeated except that N,N-dimethyl-2-amino-1-butanol is substituted for 2-amino-2-methyl-1-propanol. The resulting composition has good shelf life, and when additional urea is added and the composition is used to laminate articles, it cures rapidly at elevated temperatures.

EXAMPLE 9

The experiment of Example 4 is repeated except that N,N-dimethyl-monoethanolamine is substituted for 2-amino-2-methyl-1-propanol. The resulting composition has good shelf life, and when additional urea is added and the composition is used to laminate articles, it cures rapidly at elevated temperatures.

EXAMPLE 10

In this example, 4-ply and 6-ply laminates were prepared from 1 inch×5 inches×⅛ inch fir strips. The strips were assembled so that the end of alternate strips extended 1/16 inch beyond the end of the adjoining strip. Between each pair of strips, 0.5 ml of adhesive, prepared as described in Example 1, was spread. The assembled strips were then heated in a press at 300°F at 250 psig, and for varying periods of time of from 3 to 7 minutes, for the 4-ply, and 3–10 min. for the 6-ply. After aging at least 1 day the laminates were subjected to stress intended to cause separation at glued joints. From these tests it was determined that 3½ minutes heating time was optimum for the 4-ply laminates and five minutes was optimum for the 6-ply.

EXAMPLE 11

Laminates were prepared in accordance with Example 10 and optimum heating times were used. The composition of the adhesive was varied, however, as for Example 1. The optimum formaldehyde/urea ratio was confirmed at 1.22:1 at 1% catalyst concentration. The cloud time, or "pot life" of the catalyzed adhesive mixture is about 2.5 hours at 70°–75°F.

EXAMPLE 12

Using the catalyst of Example 1 at a concentration of 1% in the urea-formaldehyde solution, and using a formaldehyde to urea ratio of 1.22, a pressed particle board is prepared by mixing 8% by weight of the adhesive with ground wood particles. The mixture is then placed in a press at 250 psig and heated for 3.5 minutes at 300°F. A durable pressed board is thereby obtained.

What is claimed is:

1. A pre-catalyzed aqueous urea-formaldehyde composition consisting of, by weight, 50–51% formaldehyde, 20–21% urea, water and about 0.5–1.5% of a latent catalyst mixture of the hydrochloride salt of an amino alkanediol corresponding to the formula

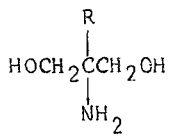

where R is methyl or ethyl, and an alkanolamine corresponding to the formula

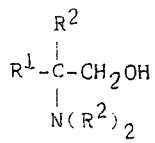

where R¹ is hydrogen or alkyl of 1 or 2 carbon atoms, and R² is hydrogen or methyl in a mole ratio of about 1.5–2.0 of the amino alkanediol per mole of alkanolamine.

2. The composition of claim 1 wherein said latent catalyst is present in a concentration of about 0.8 to 1.0% by weight.

3. The composition of claim 1 wherein said aminoalkanediol is 2-amino-2-methyl-1,3-propanediol.

4. The composition of claim 1 wherein said aminoalkanediol is 2-amino-2-ethyl-1,3-propanediol.

5. The composition of claim 1 wherein said alkanolamine is 2-amino-1-ethanol.

6. The composition of claim 1 wherein said alkanolamine is 2-amino-2-methyl-1-propanol.

7. The composition of claim 1 wherein said alkanolamine is 2-amino-1-butanol.

8. The composition of claim 1 wherein said alkanolamine is N,N-dimethyl-2-amino-2-methyl-1-propanol.

* * * * *